United States Patent Office 3,403,557
Patented Oct. 1, 1968

3,403,557
SYSTEM FOR MEASURING THE LEVEL OF A LIQUID OR PULVERULENT SOLID
Danny James Khoi, Saint-Cloud, France, assignor to Cermat, a company of Germany
Filed Jan. 17, 1966, Ser. No. 521,146
Claims priority, application France, Jan. 22, 1965, 2,953
7 Claims. (Cl. 73—313)

ABSTRACT OF THE DISCLOSURE

A level measuring system for liquids or pulverulent solids in which the weight of a sensing element, suspended from a cable wound on a drum, is balanced partly by the buoyancy of the measured medium and partly by a magnetic torque established between the driving wheel and the drum, magnetically coupled to the driving wheel. When equilibrium is reached, the angular position of the driving wheel, corresponds to the medium level. Preferably equilibrium is detected by means of a differential transformer, the output of which controls the actuating of the driving wheel.

---

Figure 1:
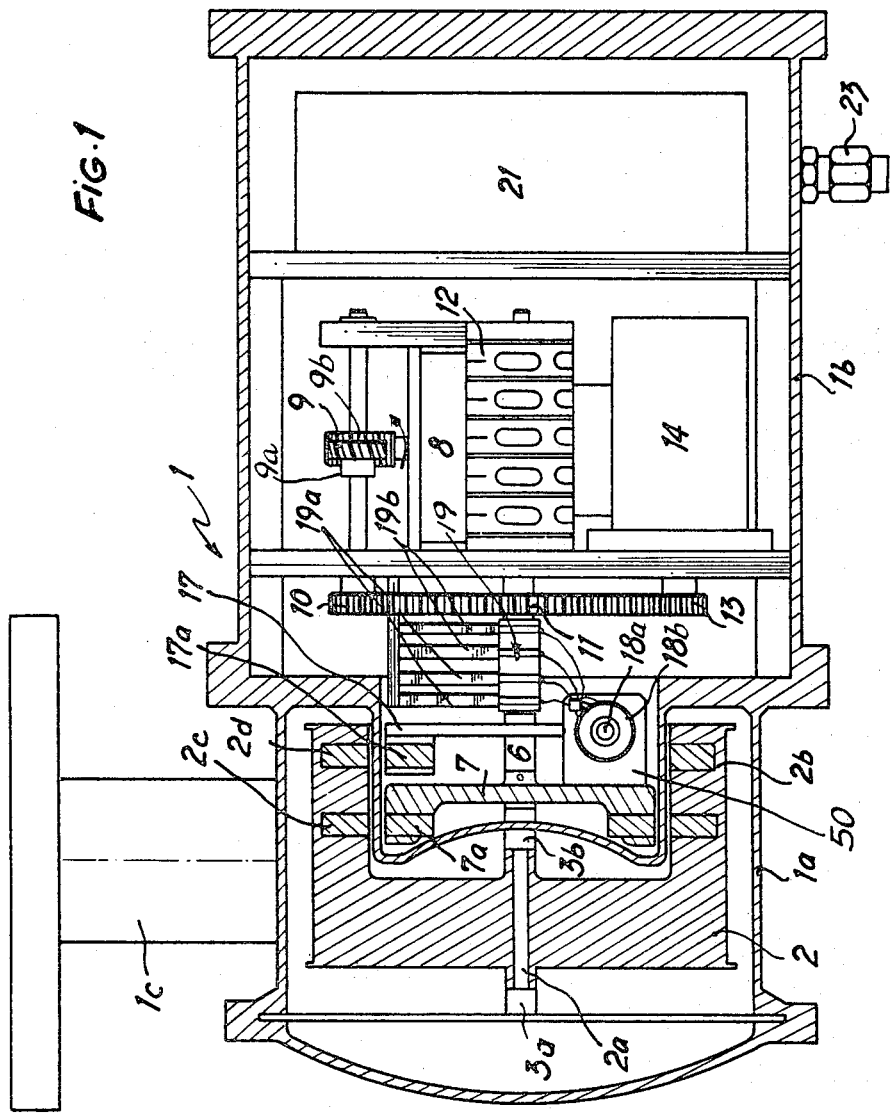

This invention relates to level measuring apparatus for which there is a need in many technical fields both for measuring liquids and pulverulent solids.

In practice, remote measurement is necessary because direct measurement is generally impossible or at least complicated. Remote measurement of a level is necessary, for example, for tanks which contain hydrocarbons which are normally liquid (for example petrol) or which are compressed and liquefied (ethylene, propane, propylene, for example).

Because of the large dimensions of the tanks in which the level is required to be measured, and the large horizontal sections of such tanks, the accuracy with which the level is measured must be relatively high for satisfactory evaluation of the corresponding volume. In France, the official department concerned with measuring instruments requires that tank level measuring systems must have a sensitivity equivalent to a maximum absolute error of 2 mm. on the level measured.

An object of the present invention is to avoid one or more of the disadvantages of a level measuring system in which a sensing element is suspended from a rope wound on a drum with its weight partly balanced by a spring and partly by the buoyancy of the medium whose level is being measured or the vertical reaction of the medium if it is a pulverulent solid.

One such disadvantage is caused because the detection of a change in the equilibrium of the sensing element is by purely mechanical elements usually a spring whose conditions of operating vary with age. Another disadvantage arises from the use of electrical contacts operated by the mechanical elements which contacts are subjected to wear and affect the accuracy of the equipment.

Thirdly, there is the disadvantage that the pressure difference between the elements inside the tank and subjected to its internal pressure and those outside the tank at atmospheric pressure require sealing glands which inevitably permit some leakage.

According to the present invention the sensing element is supported at the measured level partly by the reaction of the medium to be measured and partly by reaction means associated with the drum. The drum is driven in either direction by drive means through a non-positive coupling having a driving and driven member, the drive means being operated in response to a detected displacement between the driving and driven members of the coupling.

There need be no physical action between the two members of the coupling and indeed they can be in different chambers if, as is preferred, the non-positive coupling is a magnetic coupling. This may itself constitute the means providing the reaction associated with the drum since displacement between the two magnetic members of the coupling will produce a torque partly supporting the sensing element.

The displacement between the members of the coupling can be detected by non-mechanical means, for example, by means of a differential transformer having windings on a core, one coupled to the drive means and one coupled to the drum and it follows that the accuracy of detection does not decrease with mechanical wear of parts.

Also there need be no make and break electrical contacts since for example the detecting means may include a wheel freely mounted in relation to the drum axis and coupled to said drum magnetically, the differential transformer core being connected to this wheel and the transformer windings being connected to the drive means. This means that the transformer windings can be permanently connected in a detecting circuit, the current or voltage in which will be a measure of the relative displacement between core and winding.

A servo motor may be used in the drive means for driving the drum and this can be a two phase motor having one winding fed from a reference supply and one from the output winding of the differential transformer.

A measure of the actual level can be provided by a counter driven from the drive means and an external counter can be provided coupled to the drive means through selsyns.

The invention may be carried into operation in various ways and one embodiment will now be described by way of example with reference to the accompanying drawings.

Figure 2:
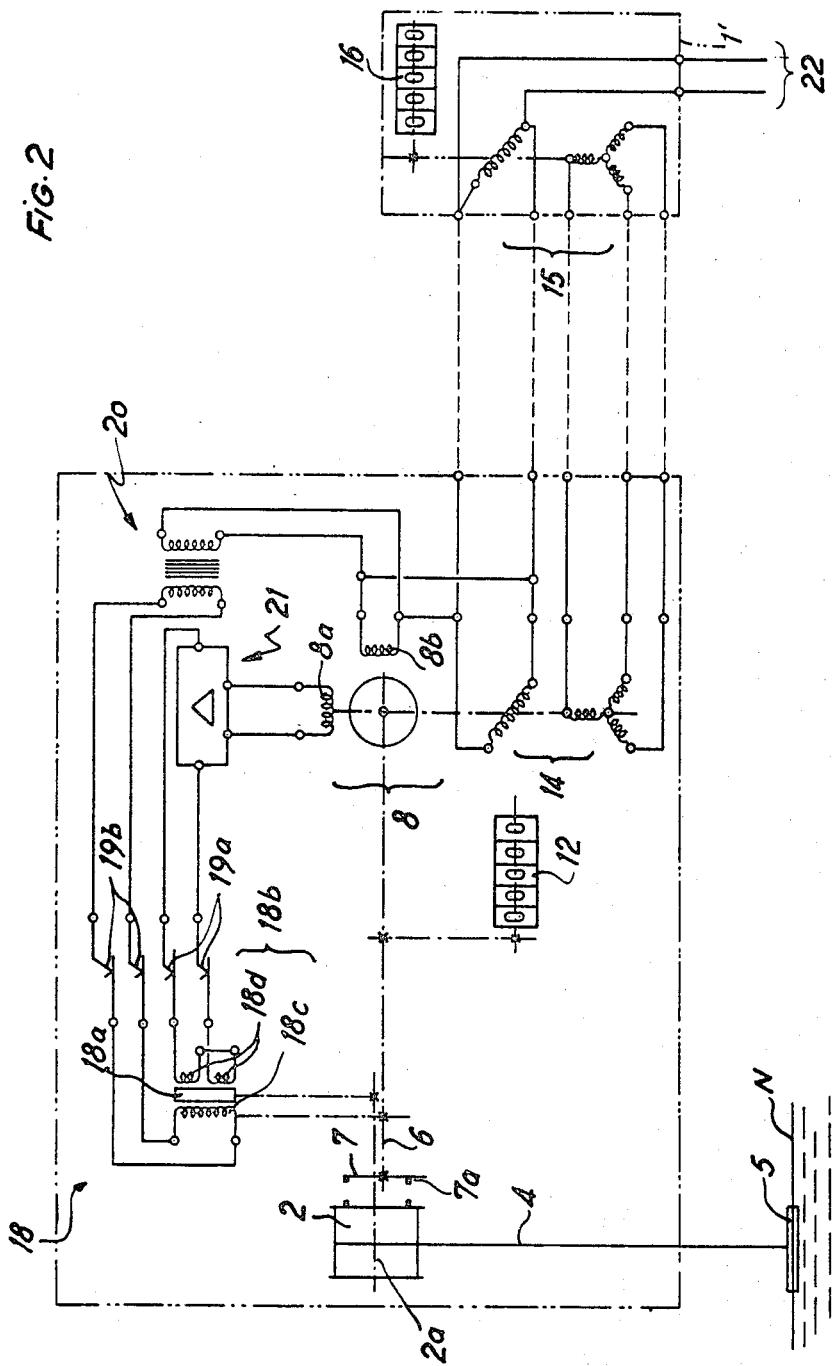

In the accompanying drawings:

FIGURE 1 is an axial sectional view of the level measuring equipment according to the invention, and FIGURE 2 diagrammatically illustrates the operation of this equipment.

A casing 1 is divided into two separated parts 1a and 1b and has a hollow suspension element 1c. This casing is advantageously of stainless steel, or anodized aluminum, so that it is not affected by the vapor of the fluid whose level is to be measured. Inside part 1a of the casing is a cylindrical drum 2 freely rotatable on its spindle 2a borne on two bearings 3a and 3b. A rope 4 (not shown in FIGURE 1) is wound on the drum 2, which advantageously has guide grooves, and leaves the system, for example, via a duct (not shown) in the suspension element 1c. After passing over any pulleys that are provided, the rope drops vertically to the fluid level as shown in FIGURE 2 for measurement by the effect of the weight of a sensing element 5 which is, for example, a flat aluminum disc. The drum 2 is in the form of a hollow cylinder having an annular ring portion 2b; on its inner periphery the ring 2b has two rows of rings 2c and 2d of radially extending straight magnets, the SN and NS orientations of the magnets alternating in each ring, each ring bearing the same number of magnets. The casing part 1b, which is flameproof, has a cylindrical projection housed in the hollow of the drum 2. In this casing half, the drive shaft 6 is mounted in alignment with (but not physical contact) with the shaft 2a. At its end drive shaft 6 it has a driving wheel 7 keyed thereon and bears at its periphery a ring of radial magnets 7a of the same number as, and disposed to correspond with, the ring 2c. The rings of magnets 2c and 7a co-operate to provide a magnetic coupling between the drive shaft and the drum. The drum 2 thus follows the movement of the drive wheel 7 with a small angular offset which is in any case less than the angular half interval separating two adjacent radial magnets of the rings 2c and 7a.

The drive shaft 6 is driven by a two-phase servo motor 8 via a worm gear assembly 9 having a worm gear 9b and a cooperating gear 9a connected to a step-down gear 10, 11 (multiplication ratio 5).

A counter 12 is provided at the shaft end 6.

The movement of the shaft 6 is transmitted through gears 11 and 13, similar to the gear 10, to a selsyn 14 associated with a selsyn 15 outside the instrument, which is for example disposed in a control room; the two selsyns 14 and 15 form a known synchronizing system.

A counter 16 is associated with the selsyn 15 and thus reproduces the readings of the counter 12 since the step-down ratios of the gears 11–10 and 11–13 are the same.

The counters 12 and 16 indicate the position of the sensing element 5; they can be directly graduated in level readings.

A wheel 17 is mounted loosely on shaft 6. At its periphery it has a single radial magnet 17a opposite the innersurface of the ring of magnets 2d, so that the wheel 17 is caused to follow the movements of the drum 2.

The winding assembly 18b of a differential transformer is mounted on a bracket 50 fixed to the drive wheel 7, the core 18a of the transformer being fixed on the free wheel 17. The transformer is thus used to detect the difference between the relative position of the drum 2 and the drive wheel 7 in relation to a mean relative position, and is inserted in the circuit shown completely in FIGURE 2.

This mean relative position corresponds to a position of the sensing element 5 in equilibrium on the level N to be measured.

In this position the weight of the sensing element is balanced by the reaction of the medium (Archimedean buoyancy in the case of a fluid); and by the magnetic coupling reaction of the drum corresponding to a small given angular off-set between the drum 2 and the drive wheel 7.

The system also comprises a commutator 19 mounted on the shaft 6, and connected to the transformer 18 which follows the drum 2 and the wheel 7 in its movement. By means of the commutator brushes 19b and 19a, the primary 18c and the secondary 18d respectively of the transformer are electrically connected respectively to the secondary of a transformer 20 and to an amplifier 21, as shown in FIGURE 2, in which the elements incorporated in the casing 1 of FIG. 1 are shown in FIG. 2 as included within a chain-dotted rectangle 1'. The output of the amplifier 21 is connected to the control phase 8a of the two-phase servomotor 8 to which it transmits the amplified signal from the secondary windings 18d of the transformer 18. A common voltage supply 22 (110 v. A.C.) feeds in parallel the two selsyns 15 and 14, the reference phase 8b of the servomotor 8, and the primary of the transformer 20. In practice the power line and the connections between the selsyns are combined in a single cable, the cable entry to the instrument being at 23.

When the sensing element is at the level for measurement, in the above defined mean relative position of the drum 2 and the drive wheel 7, the weight of the sensing element 5 is balanced by the reaction of the medium whose level is being measured and the reaction of the drum corresponding to a specific value of the magnetic coupling between the drum 2 and the drive wheel 7.

By the design, no net current then flows through the secondary winding 18d of the transformer 18, and the control phase 8a of the servomotor 8 is not energized. The servomotor 8 does not operate.

When the level N varies, the reaction of the medium on the sensing element varies and hence the reaction of the drum varies, and in practice this is expressed as a variation of the relative position of the drum 2 and of the drive wheel 7 until equilibrium is restored by variation of the magnetic coupling between them.

This variation of the relative position is expressed in practice by movement of the core 18a of the transformer with respect to the windings 18b. An electric signal appears at the terminals of the secondary winding 18d and after amplification by the amplifier 21 this signal energizes the control phase 8a of the servomotor 8 which starts up, and drives the wheel 7 and the drum 2 in the required direction, until when equilibrium of the sensing element is restored, the core 18a of the transformer resumes its mean position with respect to the windings 18b, thus resulting in no further signal to energize the control phase 8a of the servomotor, which stops. The sensing element 5 can thus follow all the variations of the level N.

In addition, the counters 12 and 16 which follow the movement of the shaft 6 thus record any variations in the level N.

A high accuracy of measurement is obtained. The detection provided by the differential transformer 18 is very accurate; and the minimum relative movement of the core 18a with respect to the windings 18b which can be detected is of the order of ¼ of a micron. Taking into account the other causes of error (essentially the varying weight of unwound rope and imperfections in the mechanical transmission leading to the counter), the maximum absolute error with respect to the level measured by an instrument calibration of the counters is obtained empirically by having the counter display, for a given level, the same value as obtained through direct measurement by means of a gauge.

A reference support or plate can also be provided, which is secured at a very low level in the tank. The sensing element can be dropped as far as this plate and the counters can be adjusted with reference to this position. The sensing element can be dropped below level N in this way by disconnecting amplifier 21 and noting when the sensing element and the support come into contact by means of a minimum current relay connected to the terminals of the secondary of the differential transformer, such relay reconnecting the amplifier when the sensing element reaches the level of the support.

This reference measurement of the bottom, which is possible because of the differential transformer, is a feature of the system according to the invention and is very important in practice. Such reference measurement is essential for tanks subject to high stresses in which the relative position of the bottom varies with time in proportions which are frequently considerable (perhaps several centimetres). For example, this applies to liquid methane tanks which contract in operation, or spherical pressure vessels for the storage of propane or butane which deform under the pressure.

In the specific case of a pulverulent solid, the sensing element will advantageously and conventionally be in the form of a sphere and not a plate or disc.

Finally it should be noted that the use of a magnetic coupling avoids the need for the drum shaft to pass through the partition of the casing half 1b so that the system is independent of the half shafts 2a and 6 and there is no need for a packing gland with its sealing problems.

What I claim as my invention and desire to secure by Letters Patent is:

1. A remote level measuring apparatus comprising a rotatable drum, a cable wound on the drum and a sensing element fixed at the end of the cable, said sensing element being in a state of equilibrium at the measured level, the weight of said sensing element being then balanced partly by the reaction of the medium to be measured and partly by the drum, reversible rotating drive means for driving the drum in either direction, indicating means to indicate the angular position of the drum, corresponding to the measured level, means magnetically coupling said drum and said drive means so that a torque is produced between said drive means and said drum, responsive to their relative angular position, and detecting means to detect any relative displacement of said drum and said drive means departing from the relative angular position in the state of equilibrium and to actuate said drive means until said equilibrium position is reached.

2. Apparatus as claimed in claim 1 in which the detecting means comprises a differential transformer having windings and a core, one coupled to the drive means and one coupled to the drum.

3. Apparatus as claimed in claim 2 including a two phase servomotor constituting part of the drive means, selsyns, an external counter coupled to the drive means through said selsyns, in which one phase of said motor is connected to the output from said differential transformer, the other phase of the servomotor being fed in parallel with said selsyns.

4. Apparatus as claimed in claim 1 in which the drum is in the form of a hollow cylinder and the magnetic coupling comprises a row of magnets distributed around the internal periphery of the cylinder and having north and south poles alternating around the periphery.

5. Apparatus as claimed in claim 4 in which the drive means includes a drive wheel disposed within the drum cylinder and having magnets disposed around its external periphery co-operating with the magnets in the drum.

6. Apparatus as claimed in claim 5 in which the detecting means includes a wheel freely rotatable about the drum axis and coupled thereto magnetically, the differential transformer core being connected to this wheel and the transformer winding being connected to the drive wheel.

7. Apparatus as claimed in claim 5 including a wall separating the two sets of magnets and a partition between a first chamber and a second chamber, said first chamber containing the drum and said second chamber containing the drive wheel.

References Cited

UNITED STATES PATENTS

| 2,216,035 | 9/1940 | Lang | 73—313 |
| 2,567,823 | 9/1951 | Needham | 73—313 |
| 2,971,378 | 2/1961 | Mayes | 73—313 |

FOREIGN PATENTS

| 910,426 | 1/1928 | France. |

S. CLEMENT SWISHER, *Primary Examiner.*

DANIEL M. YASICH, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,557                                    October 1, 1968

Danny James Khoi

It is certified that error appears in the above identified patent and that said Letters Patent are hereby corrected as shown below:

In the heading to the printed specification, line 5, "a company of Germany" should read -- a company of France --.

Signed and sealed this 10th day of March 1970.

(SEAL)
Attest:

Edward M. Fletcher, Jr.                      WILLIAM E. SCHUYLER, JR.
Attesting Officer                              Commissioner of Patents